United States Patent [19]

Genna et al.

[11] Patent Number: 4,782,233
[45] Date of Patent: Nov. 1, 1988

[54] MULTIFIELD COLLIMATOR SYSTEM AND METHOD AND RADIONUCLIDE EMISSION TOMOGRAPHY CAMERA USING SAME

[75] Inventors: Sebastian Genna, Belmont; Andrew P. Smith, Medford, both of Mass.

[73] Assignee: Digital Scintigraphics, Inc., Cambridge, Mass.

[21] Appl. No.: 876,811

[22] Filed: Jun. 20, 1986

[51] Int. Cl.$^4$ .............................................. G01T 1/20
[52] U.S. Cl. ............................... 250/363 S; 250/505.1
[58] Field of Search ........ 250/363 S, 363 SB, 363 SH, 250/505.1

[56] References Cited

U.S. PATENT DOCUMENTS 3,784,820  1/1974  Miraldi ............................ 250/363 SB
4,095,107  6/1978  Genna et al. ..................... 250/363 SB
4,389,569  6/1983  Hattori et al. ................... 250/363 SB Primary Examiner—Janice A. Howell
Attorney, Agent, or Firm—Joseph S. Iandiorio; Douglas E. Denninger

[57] ABSTRACT

A multifield collimator system and radionuclide emission tomography camera using same which include at least two collimator segments whose fields of view in combination define at least two tomographic field of view boundaries. At least one of the boundaries encompasses the region to be imaged of an object. The fields of view may overlap at least in part to produce enhanced imaging sensitivity in the portion of overlap. The tomography camera detects radionuclide emissions from the region to collect at least one collimated image through each segment and combines the collimated images to produce a final image of the region exhibiting enhanced sensitivity in the portion of overlap. A multifield method of collimation is also disclosed.

30 Claims, 10 Drawing Sheets

MULTIFIELD COLLIMATOR SYSTEM AND METHOD AND RADIONUCLIDE EMISSION TOMOGRAPHY CAMERA USING SAME

FIELD OF INVENTION

This invention relates to the imaging of objects by radionuclide emission tomography and more particularly to a multifield collimation method and apparatus for the collimation of emission signals in radionuclide emission tomography cameras.

BACKGROUND OF INVENTION

Conventional radionuclide emission tomography cameras construct three-dimensional images of an object's radionuclide distribution from a sequence of two-dimensional images collected through a single collimator or number of collimator segments from a large number of viewing angles around the object being imaged. The very nature of the image reconstruction process, that is, the underlying mathematical theory and associated computer reconstruction algorithms, is such that in a preferred construction a tomographic field of view in the camera system encompasses the entire object being imaged. A tomographic field of view is the enclosed region of a field defined by the intersections of one or more collimator fields of view as the collimators rotate about the object of view through $2\pi$ radians. Failure to include the entire imaged object in a tomographic field of view results in insufficient information to uniquely reconstruct its three-dimensional radionuclide distribution.

When a rotating planar radionuclide camera is employed to collect the images for reconstruction, a single continuous parallel hole (channel) or converging hole collimator, having a field of view encompassing the object, is used in order to restrict emissions received by the camera detector from the object to those gamma rays following parallel or diverging projections toward the detector. In the case of stationary annular camera detector with rotating collimator, such as in the patents of Hattori et al., U.S. Pat. No. 4,389,569, and Genna et al., U.S. Pat. No. 4,584,478, a rotating annular collimator system is segmented into a multiplicity of either parallel hole or converging hole collimators; however, each of these collimator segments still has a tomographic field of view as large as, or larger than, the imaged object, and provides only one such field of view.

A shortcoming of both of these systems is that the imaged object's radionuclide distribution is sampled either with uniform efficiency in the case of the parallel hole collimator or, in the case of the annular camera with rotating converging hole collimator, the center of the tomographic field of view is sampled with a lower efficiency than the periphery. Experimental studies of the effect of uniform sampling (Pang, S. C. and Genna, S., "Noise Propagation in 3-D Fourier Convolution Reconstruction" in *Image Processing for* 2-D and 3-D Reconstruction from Projections, Optical Society of America, PD-11, 1975) using a uniformly emitting water phantom have shown a substantial increase in the variance per pixel or decrease in the signal-to-noise ratio of the reconstructed data near the central portion of the imaged phantom. In clinical applications, however, the central regions of an imaged human body part are typically those in which enhanced imaging ability is desired, i.e., less variance in the measured data.

SUMMARY OF INVENTION

It is therefore a primary object of this invention to improve the imaging efficiency of radionuclide emission tomography cameras in regions of an imaged object exhibiting the greatest clinical interest.

It is a further object of this invention to enhance camera sensitivity in regions of the imaged object where the fields of view in a multifield of view collimator system overlap.

It is a further object of this invention to provide a multifield collimator system whose overlapping fields of view are aligned to produce a more uniform signal-to-noise ratio in the reconstructed image.

It is a further object of this invention to provide a multifield collimator system whose tomographic fields of view overlap in such a manner that the imaging sensitivity of the camera is enhanced in particular regions of the imaged object, for example, the central or peripheral portions of the human brain in a clinical application.

This invention results from the realization that a truly effective system for collimating radionuclide emissions from a region of an object to enhance imaging sensitivity as desired can be achieved by aligning the fields of view of two or more rotatable collimator segments to define at least two tomographic field of view boundaries, at least one of which encompasses the region. Enhanced imaging sensitivity is produced where portions of segment fields of view overlap.

This invention features a radionuclide emission tomography camera for imaging a region of an object, including at least two collimator segments whose fields of view overlap at least in part and in combination define at least two tomographic field of view boundaries, at least one of the boundaries encompassing the tomographic field of view region to be imaged. The camera further includes means, responsive to the collimator segments, for detecting radionuclide emissions from the region to collect at least one collimated image through each segment, and means for combining the collimated images to produce a final image of the region exhibiting enhanced sensitivity in the portion of overlap.

In one embodiment, the camera further includes means for rotating the collimator segments relative to or in unison with the means for detecting. The collimator segments may have a common axis of rotation and the boundaries may be concentric from each other about the axis of rotation. The means for rotating moves the collimator segments to successive positions about the region and the means for combining includes means for matching together images collected at the same position. The means for matching may add together collimator images collected at each position through the collimator segments when each segment is centered at that position.

This invention may also be expressed as a multifield collimator system for use in a radionuclide emission tomography camera to image a region of an object. There are at least two collimator segments whose fields of view in combination define at least two boundaries; at least one of the boundaries encompasses the region to be imaged.

In one embodiment, the fields of view of the collimators overlap at least in part and the collimators enhance imaging sensitivity in the portion of overlap. The field of view of one of the collimators may completely overlap that of the other collimator so that the other, overlapped collimator enhances imaging sensitivity throughout its field of view. The collimator segments may be rotatable and have a common axis of rotation so that the boundaries are concentric about the axis of rotation and are defined as closed curves. The segments may be segments of a planar or arcuate collimator translatable toward or away from the region. The segments may define at least one boundary which encompasses the entire object.

In other embodiments, one or more of the collimator segments exhibit uniform imaging sensitivity, and one or more segments have non-uniform imaging sensitivity. Further, one or more of the collimator segments may be a parallel type collimator, a converging type collimator, or a diverging type collimator. The collimator segments may be segments of an annular rotating collimator.

This invention also features a multifield collimator system including at least two collimator segments, one of which has a field of view at least as large as the imaged object and the other of the collimator segments has a field of view smaller than the imaged object. The collimator segments enhance imaging sensitivity in those regions of the object in which the fields of view of the collimator segments overlap.

This invention further features a multifield collimator system having at least two collimator segments whose fields of view in combination define at least one tomographic field of view boundary and a third collimator segment having a field of view which overlaps a portion of at least one of the other fields of view to enhance imaging sensitivity in the portion of overlap.

This invention also features a multifield method of collimation for a radionuclide emission tomography camera to image a region of an object, including aligning two fields of view relative to the region to define in combination at least two boundaries; at least one of the boundaries encompasses the region. The method further includes detecting within the fields of view emission signals from the region. The fields of view may be aligned to overlap at least in part to produce enhanced imaging sensitivity in the portion of overlap.

DISCLOSURE OF PREFERRED EMBODIMENTS

Other objects, features and advantages will occur from the following description of a preferred embodiment and the accompanying drawings, in which.

Figure 1:
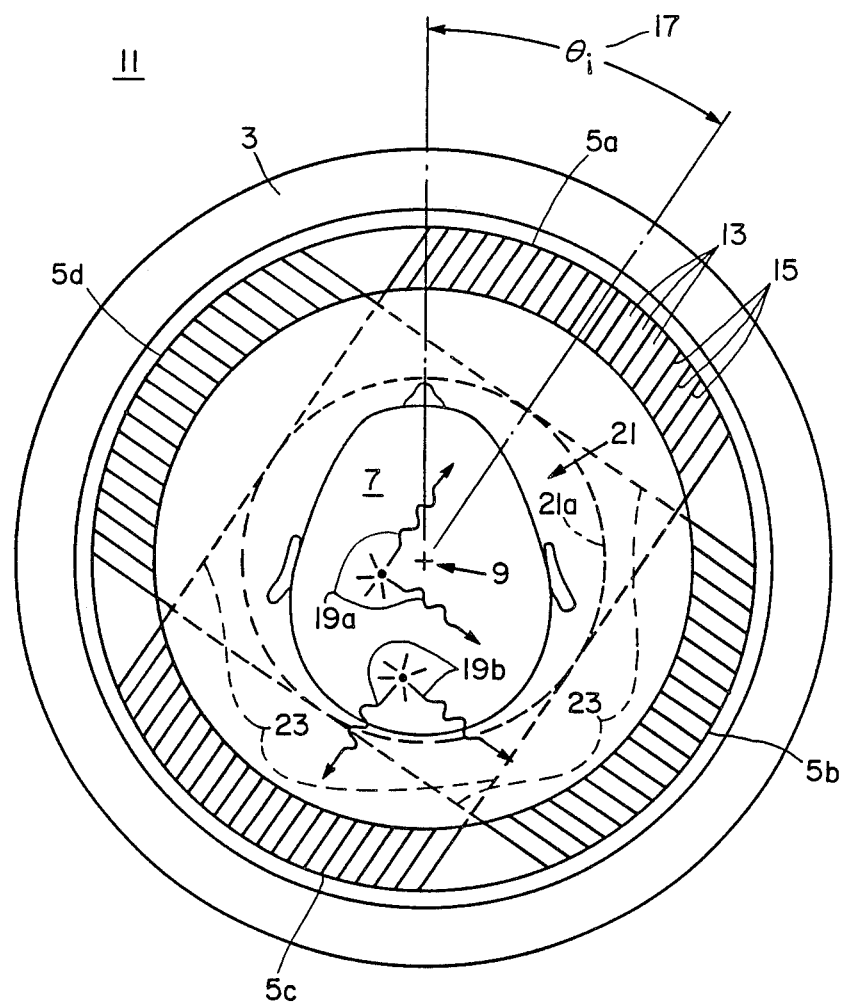
FIG. 1 is a conventional annular collimator system employing several parallel type collimator segments that illustrates the difference between the collimator field of view and the tomographic field of view, that is, the view within the boundary defined by the rotating collimator field of view.

There is shown in FIG. 1 a conventional collimator system consisting of several parallel type collimator segments 5a, 5b, 5c, 5d for use in annular radionuclide emission tomography camera 11. Each collimator segment has the same size field of view 23 as established by a multiplicity of equal hole size channels 13 separated by lead septa 15, and these fields of view are at least as wide as the breadth of the object 7 that is being imaged by position detector 3. The collimator segments 5a–5d rotate incrementally by angle 17 about axis of rotation 9, perpendicular to the page in FIG. 1, in order to generate a sequence of images surrounding the entire imaged object 7. This sequence of images is used to reconstruct the three-dimensional radionuclide distribution contained within imaged object 7. The mathematical theory and computer algorithms underlying the reconstruction process are such that the collimator segment field of view 23 must encompass the entire imaged object 7 at each of the angles 17 of view $\theta_i$.

There is also shown in FIG. 1 the tomographic field of view 21 having a boundary 21a which is defined as the intersection of the individual collimator segment fields of view 23 as the collimator segments 5a–5d rotate continuously through 360 degrees about axis of rotation 9. Only radionuclide distributions contained within the tomographic field of view 21 can be uniquely reconstructed into three-dimensional images; boundary 21a of tomographic field of view 21 represents the outermost radial position in relation to axis of rotation 9 of imaging of which camera 11 is capable. In the system of FIG. 1 four collimator segments 5a, 5b, 5c, 5d exhibit the same size segment field of view 23 and the same tomographic field of view 21. The sampling efficiency of this system is therefore the same throughout the tomographic field of view. In practice, however, radionuclide emission signals (gamma rays) 19a from the central portions of imaged object 7 typically travel through a greater thickness of the imaged object than emission signals 19b from the peripheral regions of the imaged object. Emissions produce gamma radiation 19a, 19b isotropically in the region surrounding the emission event, but such isotropy is not illustrated in FIG. 1 for clarity. Signals 19a from the central portion of imaged object 7 are thus detected by detector 3 with a lower signal-to-noise ratio than those from the peripheral regions of imaged object 7.

Figure 2:
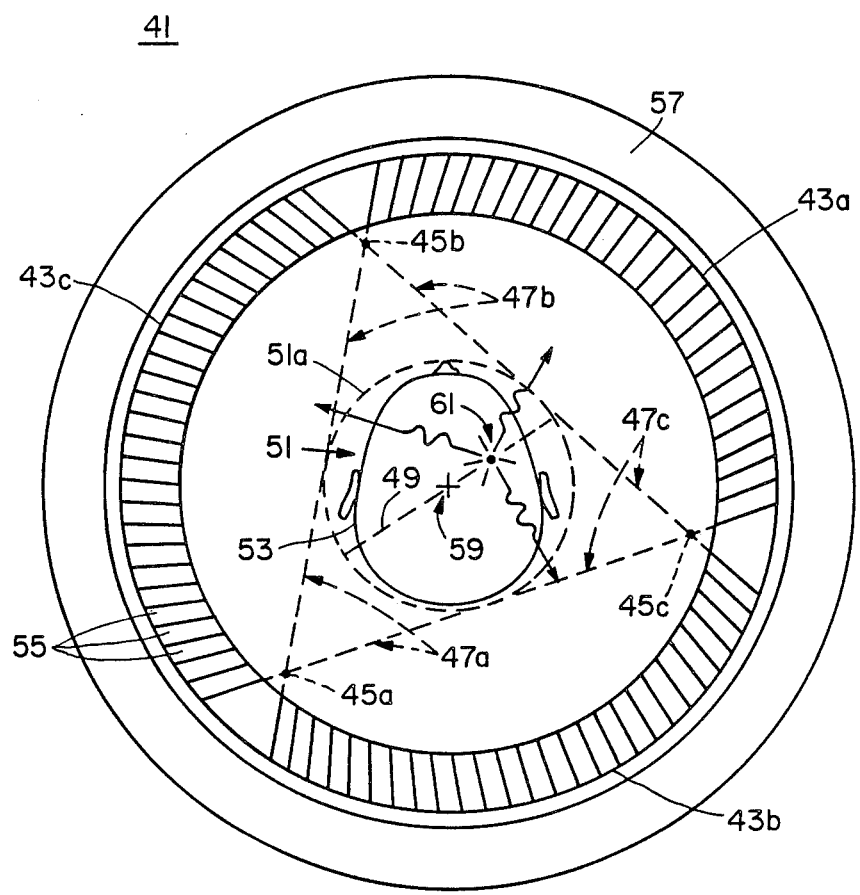
FIG. 2 is a conventional annular collimator system employing several converging type collimator segments.

FIG. 2 shows a conventional annular collimator system 41 employing three collimator segments 43a, 43b, 43c of the converging type. For each collimator segment 43, the equal size collimator channels 55 converge, respectively, to a point 45a, 45b, 45c located beyond axis of rotation 59. The individual collimator segment fields of view 47a, 47b, 47c, all the same size in this case, produce a single overlapped tomographic field of view 51 having boundary 51a as each segment rotates through 360 degrees about axis 59 that encompasses the entire imaged object 53. The system 41 of FIG. 2 illustrates a conventional implementation used in an annular radionuclide tomography camera. If the converging collimators have uniform hole dimensions, the composite response of position detector 57 to an emission event 61 positioned along a diameter 49 of the tomographic field of view 51 increases with increasing radial displacement of event 61 from axis of rotation 59 as the collimator segments rotate 360° about axis 59. Thus, in the absence of attenuation, an emission event 61 whose location along diameter 49 is further from axis 59 will result in a larger composite signal (that is, the sum of signals produced by the complete set of collimator segments 43a, 43b, 43c) than an event whose location is closer to axis 59. Although FIG. 2 illustrates a conventional collimator system employing three collimator segments 43, any number of such segments may be employed.

Figure 3:
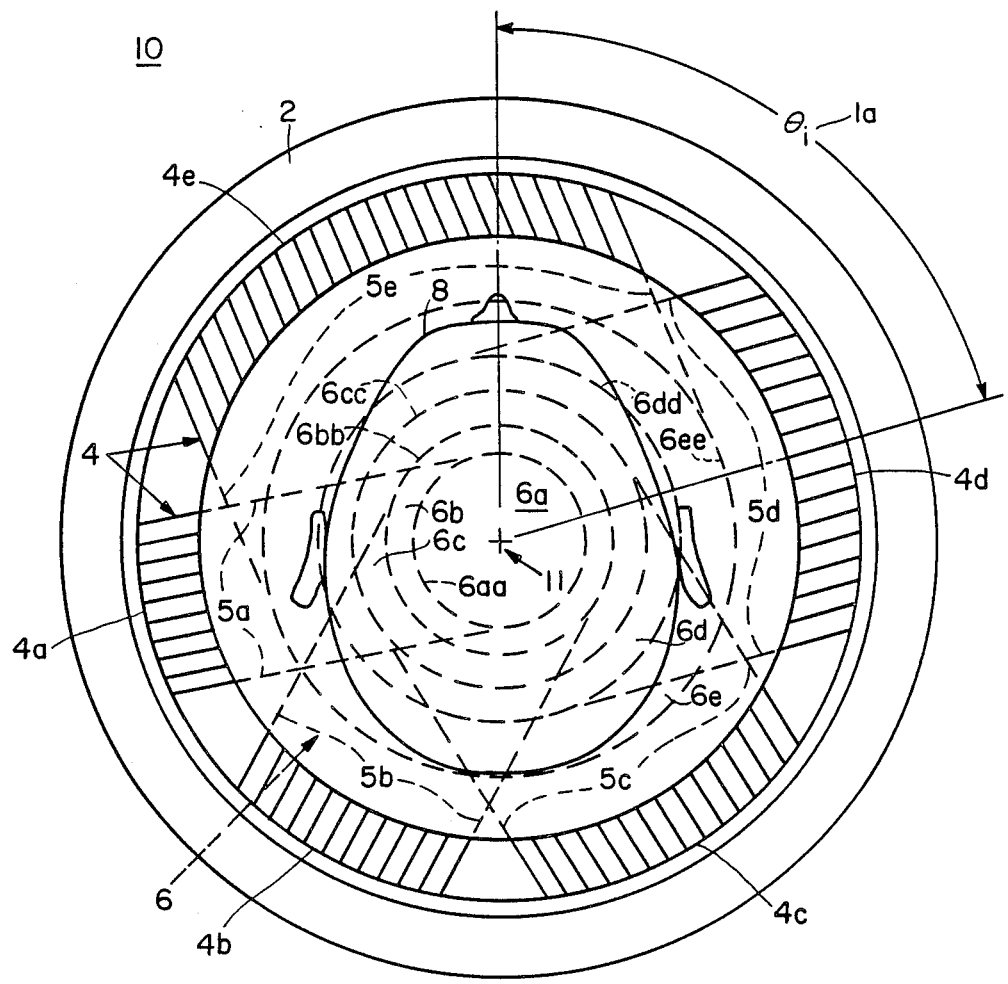
FIG. 3 is a multifield annular collimator system according to this invention employing several parallel type collimator segments with different fields of view in which one of the collimator segments defines a tomographic field of view having a boundary which encompasses the object.

There is shown in FIG. 3 a collimator system 10 for an annular radionuclide emission tomography camera. The camera comprises a scintillation position detector 2 and collimator segments 4. Scintillation detector 2 consists of means for detecting the positions of scintillations produced by gamma rays emitted by radionuclides contained within the imaged object 8. Collimator segments 4a, 4b, 4c, 4d and 4e accept emission signals only from sources within their respective collimator fields of view 5a, 5b, 5c, 5d and 5e. As described below, an image from each collimator segment centered at one of a number of view positions such as position 1, shown at the angle 1a of view $\theta_i$, is combined with other images obtained at that position from the remaining collimator segments when they are rotated to that angle of view to develop a composite image of object 8 for each view position. The imaged object 8 in FIG. 3 is shown as a human head whose radionuclide distribution is being imaged for three-dimensional reconstruction by the radionuclide emission camera system of which collimator system 10 is a part. The entire disclosure of the following U.S. Pat. Nos. are incorporated herein by reference, including their disclosures of radionuclide emission camera systems: Genna et al., 4,095,107; Genna et al., 4,228,515; Genna et al., 4,584,478; and Pang et al., 4,593,198.

Tomographic fields-of-view 6a, 6b, 6c, 6d, 6e having boundaries 6aa, 6bb, 6cc, 6dd, 6ee, respectively, are formed as a result of multiple viewing by collimator segments 4a, 4b, 4c, 4d, 4e, during tomographic imaging as the collimator is rotated through $2\pi$ radians. Tomographic fields of view 6a-6e overlap and in this construction are concentric since segments 4a-4e share the same axis of rotation 11. Gamma ray emissions occurring within the overlapping tomographic fields of view 6a, 6b, 6c, 6d of collimator segments 4 as defined earlier are imaged with enhanced efficiency or sensitivity. Thus, the central tomographic field of view 6a in FIG. 3 in which all five tomographic fields of view 6 overlap is imaged with greater efficiency than any of the other overlapping fields of view. The next central tomographic field of view, 6b, for example, is imaged only by four of the five collimator segments 4, and therefore the imaging efficiency or sensitivity in field of view 6b is eighty percent that of view 6a.

Although five collimator segments 4 with five different tomographic fields of view 6 are shown in FIG. 3, this is not a limitation of the invention. Any number of collimator segments greater than one may be used, and the tomographic fields of view may be of any desired spatial extent relative to the imaged object 8, as long as at least one boundary of the tomographic fields of view encompasses the imaged object. To uniquely reconstruct the three-dimensional radionuclide distribution in an object, at least one tomographic field of view boundary must encompass the entire object as the collimator system is rotated through $2\pi$ radians. However, it is known in the art to perform incomplete sampling which does not uniquely reconstruct the image but still provides useful information. Partial rotation of a collimator system according to this invention produces at least two incomplete tomographic fields of view each having an incomplete outer boundary which is not a closed curve. Useful information may still be obtained from the incomplete tomographic fields of view, depending on the accuracy desired. Similarly, incomplete enclosure by the outermost boundary of the entire object, e.g., encompassing as a region all or a portion of the brain itself but not the skull of a patient, may also provide useful information and is also within the scope of this invention. The phrase "encompass the region to be imaged" hereinafter includes encompassing only that portion of the object which the observer wishes to image, whether or not the object in its entirety is encompassed.

Further, the collimator segments 4 may be of any type, parallel, the type shown in FIG. 3, converging or diverging. A parallel type collimator segment is one whose axis of convergence for imaged emission signals lies along an axis infinitely far from the collimator segment. A converging type collimator segment is one whose axis of convergence lies along an axis positioned at some point in the half-space containing the collimator segment and the emission source, but not at the point at infinity. And, a diverging collimator segment is one whose axis of convergence lies at some point outside the half-space containing the emission source and the collimator segment, but not at the point at infinity. The three types of collimator segments, parallel, converging, and diverging, are well-known in the art, and are frequently described as collimator segments with "infinite," "positive" and "negative" focal lengths, respectively. Hereinafter these different terminologies may be used interchangeably or in mixed form in order to describe various types of collimator segments.

Figure 4:
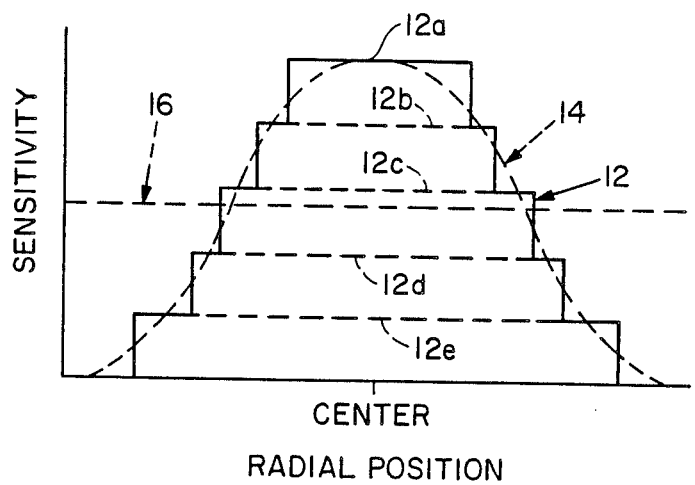
FIG. 4 is a graph of the relative sensitivity distribution (relative sampling efficiency as a function of radial position in the tomographic field of view) for a multifield collimator system employing parallel-hole uniform-sensitivity collimator segments.

FIG. 4 illustrates the relative sensitivity variation as a function of radial position in the tomographic field-of-view for several different types of collimator structures. The sensitivity distribution is a composite of collimated images centered at the same position, e.g., position 1, FIG. 3. One or more collimators that image the entire field of view uniformly exhibit the response shown in dashed curve 16, FIG. 4. Because different emission source points in the typical imaged object result in varying signal propagation path lengths through the imaged object, a uniform response curve such as curve 16 leads to a signal-to-noise ratio in the reconstructed image that decreases in central regions where the path length for emission signals is longer. This feature of typical radionuclide emission tomography cameras may be mitigated by varying the imaging sensitivity as a function of radial position in such a manner that it is increased in regions where the emission signal path length through the imaged object is longer.

An idealized non-uniform sensitivity curve 14 is shown in FIG. 4 in which maximum sensitivity occurs at the center of the imaged object. In order to achieve a continuously varying sensitivity curve such as curve 14, however, an infinite number of infinitely small collimator segments is required. In a practical collimation system, of course, only a finite number of collimator segments can be used, with the result that only an approximation to idealized curve 14 can be obtained. Piecewise continuous curve 12 in FIG. 4 illustrates a typical approximation to curve 14 achievable with a finite number of collimator segments as, for example, in the system of FIG. 3. Each collimator segment exhibits a uniform sampling efficiency, and the cumulative effect of imaging certain portions of the imaged object with overlapping tomographic fields of view from the several collimator segments is shown qualitatively in curve 12. For example, referring again to FIG. 3, collimator segment 4e with the largest tomographic field of view 6e images with uniform sensitivity 12e in FIG. 4. Collimator segment 4d in FIG. 3 with tomographic field of view 6d images its smaller field of view with the same efficiency as collimator segment 4e, with the result that the combined imaging sensitivity in tomographic field of view 6d is greater than it is in tomographic field of view 6e, as shown in curve 12d of FIG. 4. By similarly combining the uniform sensitivities of multifield-of-view collimators, the cumulative sensitivity distribution 12 is obtainable.

By using collimators with different tomographic fields of view, varying sensitivities (uniform or non-uniform), and different types (parallel, converging and diverging) many piecewise continuous sensitivity distributions can be achieved as an approximation to virtually any desired continuous radial sensitivity distribution. Thus, in regions of particular interest in the imaged object, the sensitivity can be increased with respect to its value in other areas, thus increasing the signal to noise ratio in the measured data.

Figure 5:
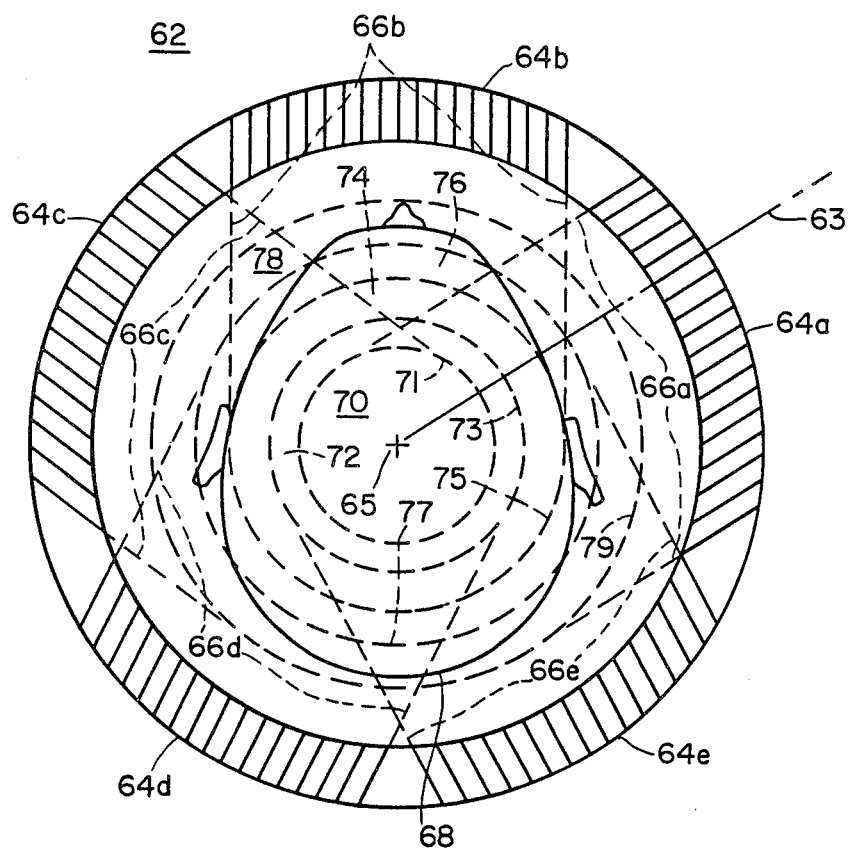
FIG. 5 is a multifield annular collimator system segmented into several parallel hole type collimator segments with different fields of view in which one of the boundaries defined by two collimator segments encompasses the object.

Multifield collimator system 62, FIG. 5, is another construction of a system according to this invention. Collimator system 62 is segmented into several parallel hole type collimator segments 64a, 64b, 64c, 64d, 64e having respective fields of view 66a, 66b, 66c, 66d, 66e which differ from each other, not one of which having a tomographic field of view large enough to encompass object 68. For example, field of view 66a encompasses all of tomographic field of view 70 but only portions of tomographic fields of view 72, 74, 76 and 78. Tomographic field of view 78 encompasses object 68; tomographic field of view 78 is defined by collimator segments 64a, 64c. Tomographic fields of view 70, 72, 74, 76 and 78 have respective boundaries 71, 73, 75, 77 and 79.

As stated above, the outer tomographic field of view boundary need not encompass the entire physical object itself. For example, collimators 64c and 64a can be eliminated such that collimator system 62 only collimates images within tomographic field of view boundary 77. The construction illustrated in FIG. 5, however, encompasses all of object 68 and provides unique image reconstruction.

As described below, one or more collimated images are collected through each collimator segment and matched with other collimated images collected at the same position, e.g. view position 63. Collimator segment 64a is shown at view position 63; segments with symmetrical fields of view about axis of rotation 65, e.g. segment 64b, are typically centered when at a view position.

Figure 5A:
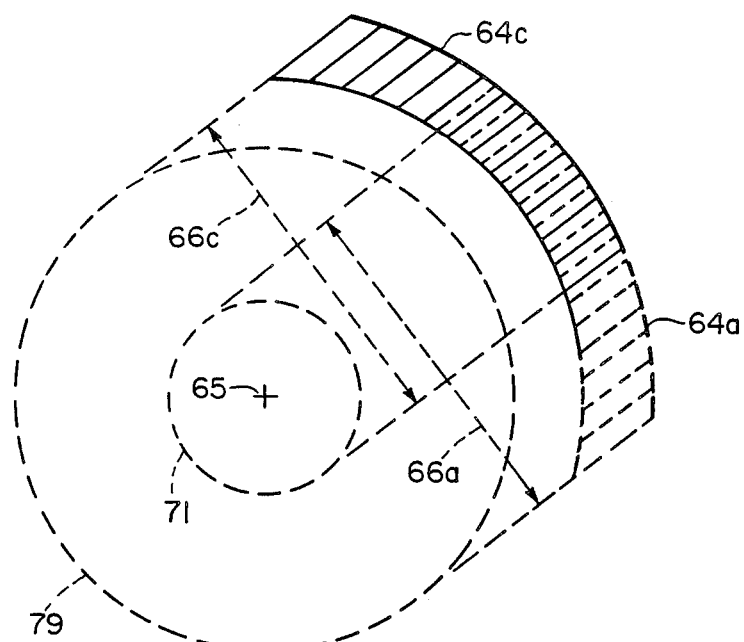
FIG. 5A is a schematic of two collimator segments of FIG. 5 aligned in parallel.

Collimator segments 64a–64e share axis of rotation 65. The overlap of collimator fields of view 66a and 66c, for example, can be compared by rotating segment 64c about axis 65 until the edges of collimator field of view 66c are parallel with those of view 66a as shown in FIG. 5A. It is seen that fields of view 66a, 66c are staggered from each other but overlap in the region of inner boundary 71. The field of view defined by boundary 71 thus exhibits twice the sensitivity of the remainder of the field described by the area between boundaries 71, 79.

Figure 5B:
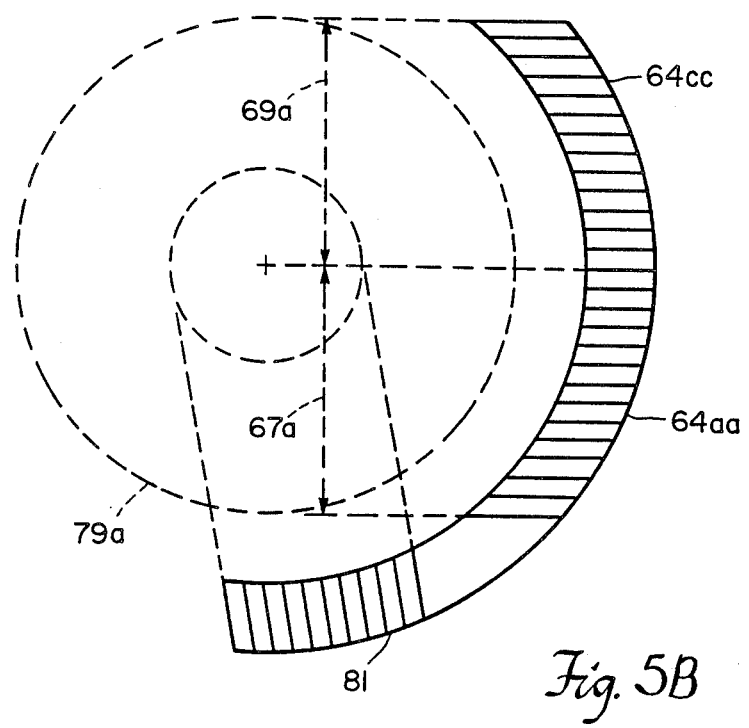
FIG. 5B is a schematic of the alignment of alternative collimator segments.

Another construction of collimator segments according to this invention is shown in FIG. 5B. Collimators 64aa, 64cc can be constructed to have their fields of view, represented by arrows 67a, 69a, aligned to lie adjacent to each other at an inner point 65a shared both by the inner boundary and the axis of rotation of segments 64aa, 64cc while still defining in combination outer boundary 79. Imaging sensitivity is enhanced when a third collimator segment, e.g., segment 81, shown in phantom, is added to overlap at least one of the other two fields of view.

Collimator 64a–64e, FIG. 5, provide the same sensitivity curve 12 as shown in FIG. 4. However, each collimator field of view 66a–66e contributes to curve 12 in a different manner. For example, the tomographic field of view between boundaries 6cc and 6dd, FIG. 3, is viewed by collimators 4d and 4e only. The tomographic field of view between boundaries 75 and 77, FIG. 5, however, is viewed by a combination of collimators 64a, 64c, 64d and 64e.

Figure 6:
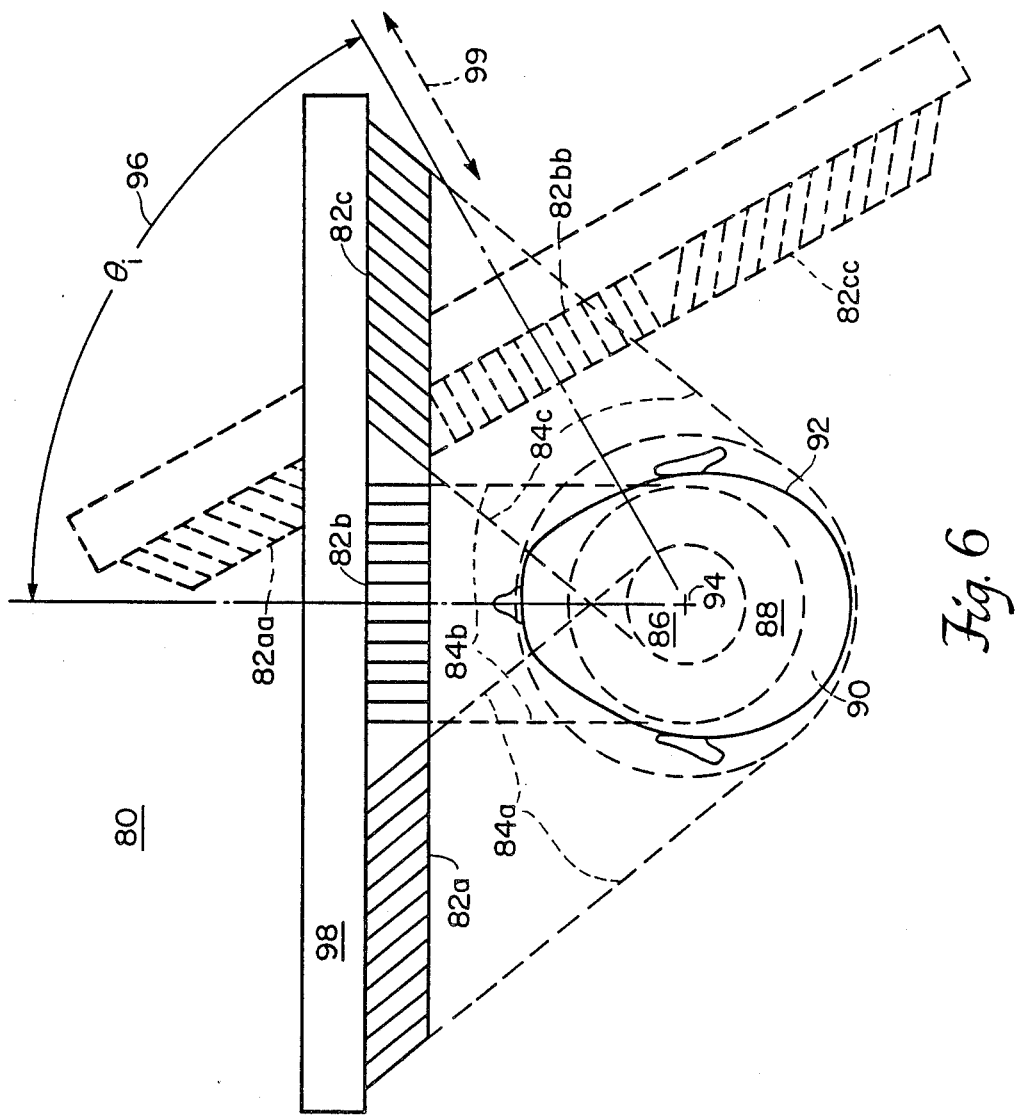
FIG. 6 is a multifield planar camera system segmented into three parallel hole collimator segments having different fields of view in which one of the defined boundaries encompasses the object.

Multifield planar camera system 80, FIG. 6, comprised of position detector 98 and collimator segments 82a, 82b, 82c, illustrates another collimator arrangement according to this invention. Collimator segments 82a, 82b and 82c provide collimator fields of view 84a, 84b, 84c, respectively which overlap in a manner that is similar to annular collimator system 62, FIG. 5, to produce concentric tomographic fields of view 86, 88, 90. Fields of view 84a, 84c of collimator segments 82a, 82c define tomographic field of view 90 which encompasses head 92.

Planar camera system 80 is rotated about axis 94 to obtain a number of views. Collimators 82aa, 82bb, 82cc, shown in phantom, represent the position of planar camera system 80 at angle of view $\theta_i$ shown by arrow 96. Similar collimator arrangements of other rotating camera systems such as the arcuate camera system disclosed in U.S. Pat. No. 4,095,107 can be utilized in similar fashion.

Both planar and arcuate camera systems can be translated, that is, moved radially toward or away from the object to be imaged. For example, planar camera system 80 in one construction is movable as shown by phantom arrow 99. Translation of a planar or arcuate camera system according to this invention results in tomographic field of view boundaries which are no longer circular.

Figure 7:
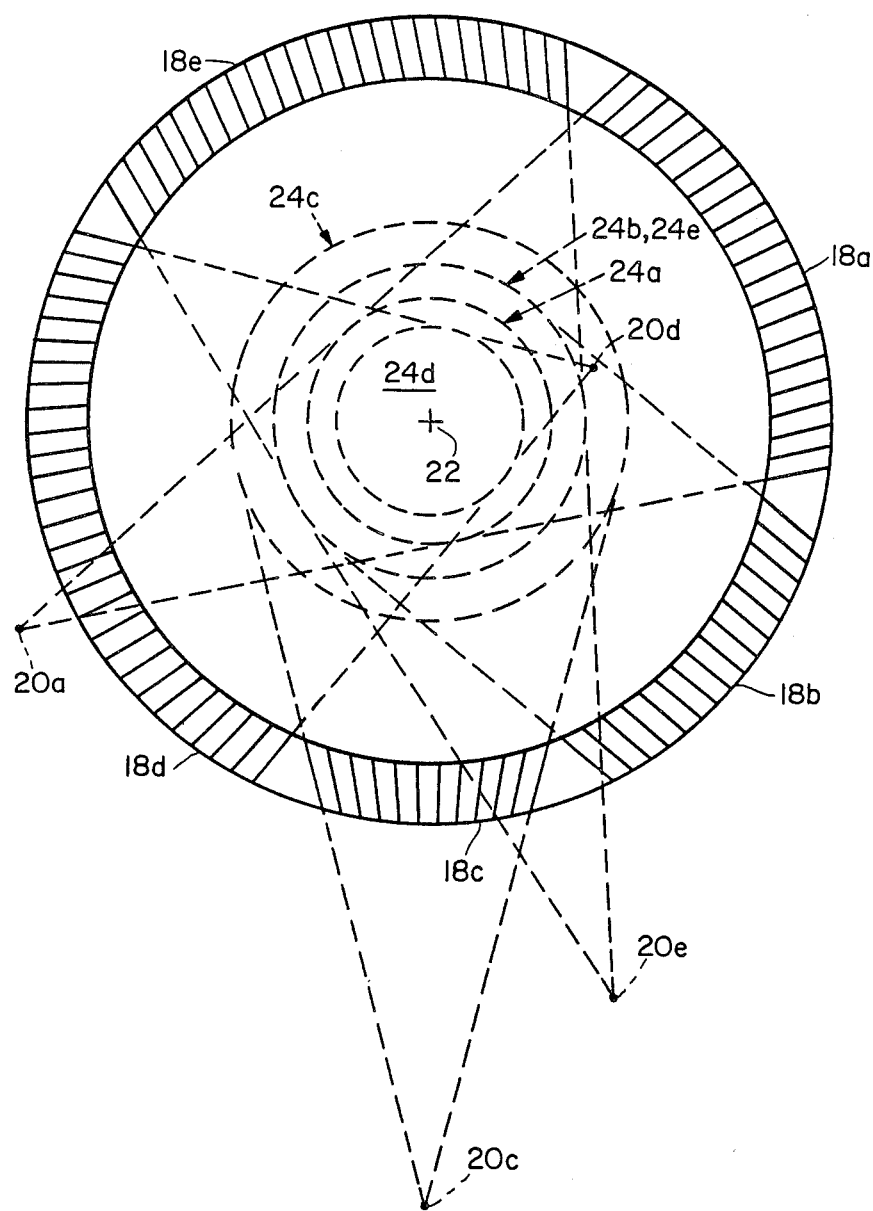
FIG. 7 is a multifield collimator system in which the collimator segments may define the same or different boundaries and have the same or different focal lengths.

FIG. 7 shows a multifield-of-view, or "multifield," annular collimator system according to this invention that utilizes several different types of collimator segments. Segment 18a is a convergent collimator segment whose axis of focus is marked by point 20a and whose tomographic field of view is 24a. Segment 18b is a parallel type collimator (focus axis at infinity) whose tomographic field of view is 24b. Segment 18c is a diverging type collimator whose axis of focus is at point 20c and whose tomographic field of view is 24c. Segment 18d is a converging type collimator with axis of focus at 20d and tomographic field of view 24d. And, segment 18e is also a converging type collimator with axis of focus at 20e and tomographic field of view 24e. Note that tomographic fields of view 24c, 24b and 24a are progressively smaller with the largest tomographic field of view 24c being at least as large as the imaged object while the others are smaller than the imaged object. Note also that tomographic fields of view 24b and 24e is the same size. By overlapping progressively more tomographic fields of view, the imaging sensitivity is increased. Thus, in the smallest tomographic field of view, 24d, the imaging sensitivity is greatest, while in tomographic field of view 24c, 24b and 24a the sensitivity progressively decreases. Dependent on design parameters, such as the cross-sectional area and length of the collimator channels as a function of position, the collimator segments 18 may each have uniform imaging sensitivity, or they may each have varying imaging sensitivity, and the composite sensitivity may be tailored to closely approximate a particular continuous sensitivity distribution. The image reconstruction of the data from such a multifocus collimator system may be accomplished by rebinning procedures similar to those conventionally used with convergent sampling collimators; see, e.g., G. T. Herman, *Image Reconstruction from Projections,* Academic Press, N.Y. (1980).

Figure 8:
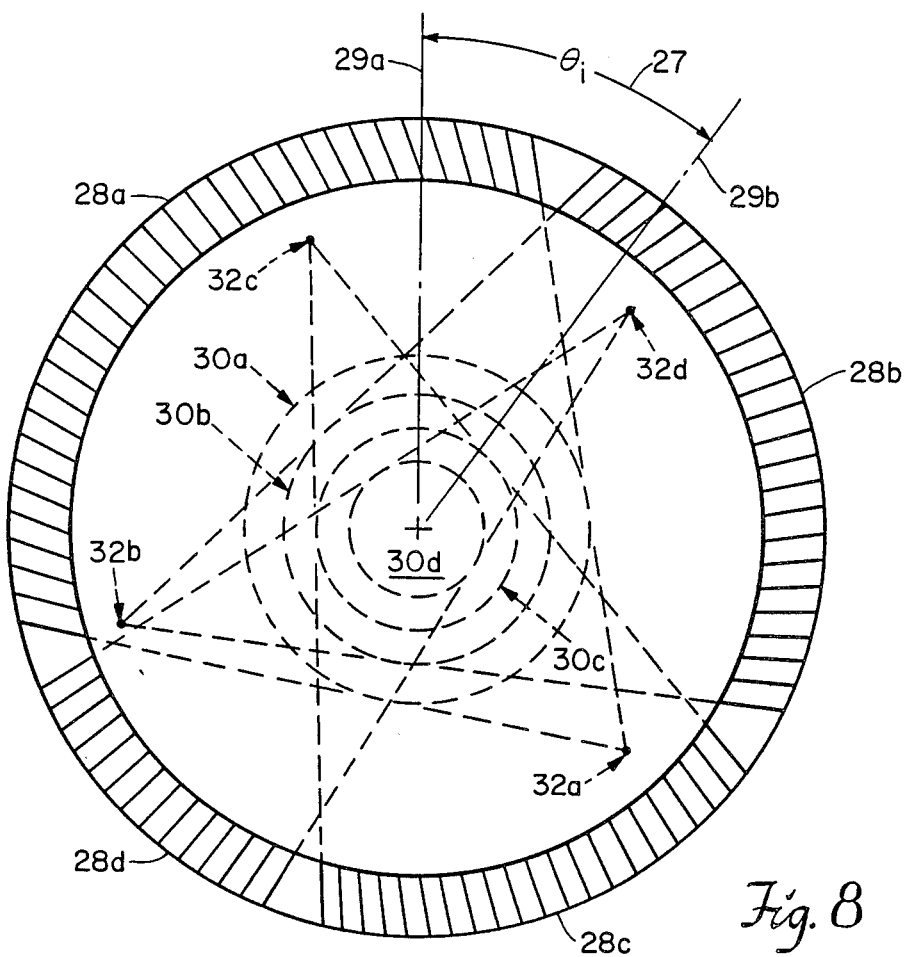
FIG. 8 is a multifield collimator system employing convergent type collimator segments each with the same focal length but defining different boundaries.

FIG. 8 shows a collimator system according to this invention utilizing several converging collimator segments 28 each of which for simplicity is arbitrarily assumed to have a collimator hole size distribution such as to exhibit uniform tomographic imaging sensitivity and the same focal length, but with different tomographic fields of view of 30a, 30b, 30c, 30d. Collimator segment 28a has the largest tomographic field of view 30a, which is at least as large as the imaged object. Segment 28a has focal point 32a. Each of the collimator segments 28b, 28c and 28d has the same focal length or segment 28a, represented by focal points 32b, 32c and 32d, but has a progressively smaller tomographic field of view 30b, 30c and 30d, respectively, each of which is smaller than the imaged object.

Figure 8A:
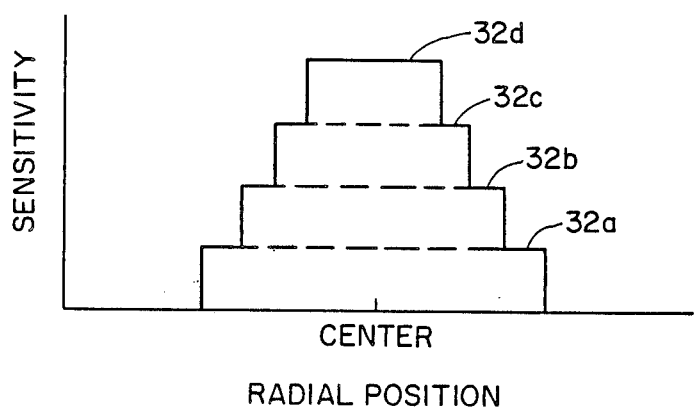
FIG. 8A is the associated composite sensitivity distribution for the collimator system of FIG. 8.

FIG. 8A shows a qualitative sensitivity curve as a function of angular position from the center of the imaged object corresponding to the collimator system of FIG. 8. Segment 28a, which views the entire imaged object, exhibits uniform sensitivity 32a in FIG. 8A, while segments 28b, 28c and 28d each contribute to increased imaging sensitivity in their respectively smaller tomographic fields of view as shown in piecewise continuous curves 32b, 32c and 32d, respectively, of FIG. 8A. The sensitivity curve of FIG. 8A is increased in the central portions of the imaged object, but other sensitivity distributions can be obtained with other collimator segment arrangements and various tomographic fields of view.

A three-dimensional multifield image of an object is acquired by combining the collimator image obtained from each collimator segment successively centered at each of N view positions distributed circumferentially about the object. The collimator structure of a radionuclide emission camera system according to this invention is rotated through N exposures to obtain the collimator images. A composite image is acquired at each of the N view positions; the N composite images from the N view positions are then combined to reconstruct a final three-dimensional image.

Figure 8B:
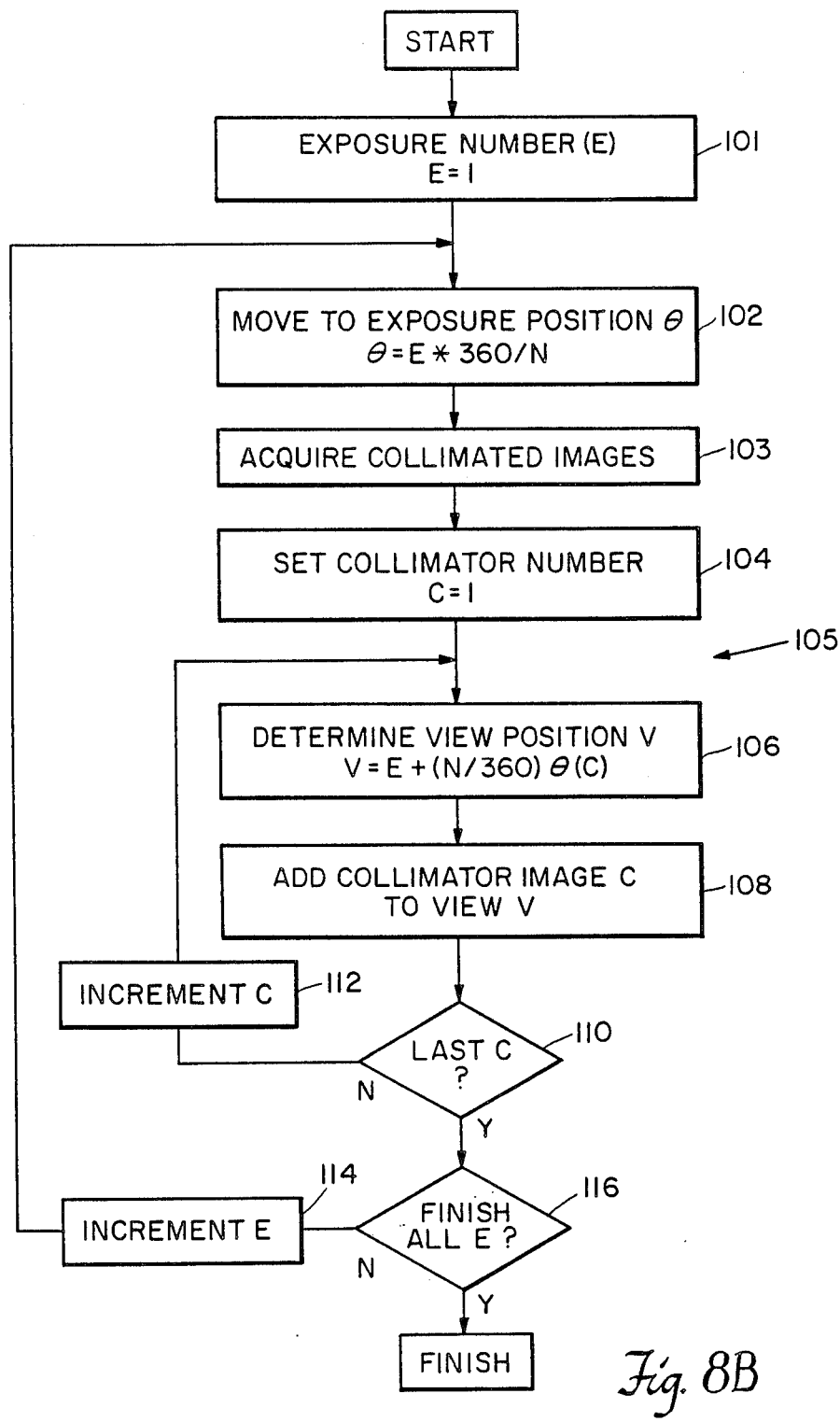
FIG. 8B is a flow chart of the operation that generates a final multifield image having the composite sensitivity distribution shown in FIG. 8A.

A collimator arrangement according to this invention, e.g., collimator segments 28a–28d, FIG. 8, can comprise a part of a radionuclide emission camera system such as shown in FIG. 1 of U.S. Pat. No. 4,584,478. The operation of such a camera system is shown in FIG. 8B. The exposure number E is set to one, step 101, and the collimator structure is rotated to exposure position $\theta$ which is based upon the exposure number as determined by the formula $$\theta = E(360/N) \tag{1}$$

where N is the number of views to be obtained. Uniform angles are established between two successive exposures by equation (1) and the coordinate system is chosen so that the last exposure, the $N^{th}$, is at an angle of 360°; however, this arrangement of these parameters is not a limitation of the invention.

For each exposure position E, the collimator images are acquired, step 103, by measuring the radioactivity distributions falling through each collimator, such as collimators 28a–28d, FIG. 8.

After the data collection for exposure E is completed, loop 105 is entered whereby the image from each of the collimator segments is added to the final image. The collimator number C is initially set to one, step 104, and the view position V is determined in step 106 according to the formula $$\theta = E + (N/360)\theta(C) \tag{2}$$

View position V represents the memory location to which the image of collimator C is to be added. The image for collimator C is then added to a memory location defined by view position V, step 108. In equation (2), a view number greater than N is considered to be that number less N. For example, if view number V has a value of N plus three, the view position to which the collimator image would be added is view three.

Loop 105 is continued by determining, step 110, if collimator number C is the last number, e.g., segment 28d, and incrementing the collimator number, step 112, until the last collimator number is reached. When all the collimator images have been added to their appropriate view positions, the exposure number is incremented, step 114, unless it is determined that a total of N exposures has been taken, step 116.

Figure 9:
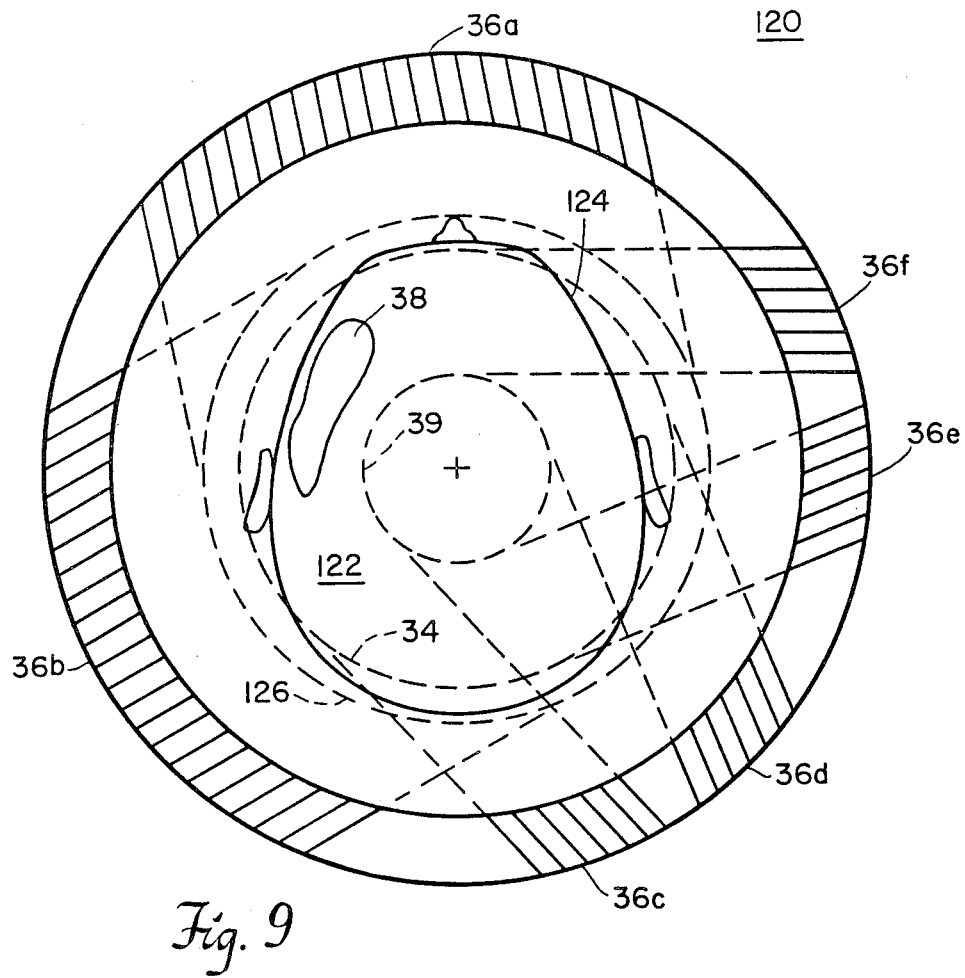
FIG. 9 is a multifield collimator system in which axially parallel type collimator segments are employed in order to enhance the imaging sensitivity in a peripheral annular region of the imaged object.

Collimator system 120, FIG. 9, according to this invention provides increased imaging sensitivity in a peripheral region 122 between cross-sectional boundaries 34 and 39. Collimator segments 36a and 36b encompass object 124 and each define cross-sectional boundary 126. The collimator fields of view of collimators 36c, 36d, 36e and 36f, however, overlap only in peripheral region 122 which is toroidal in this construction.

Figure 9A:
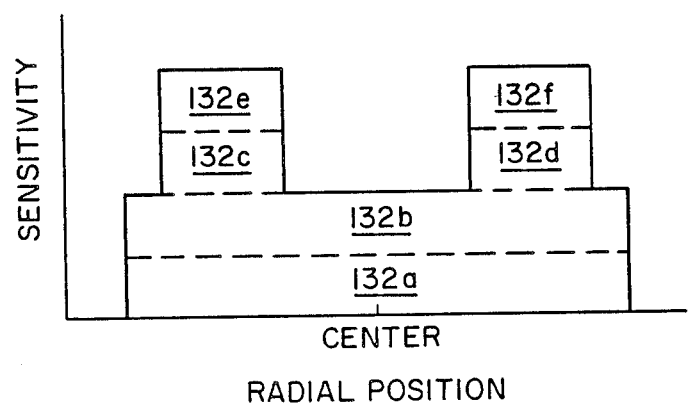
FIG. 9A is the associated composite sensitivity distribution for the collimator system of FIG. 9.

Within imaged object 124 is area of interest 38 such as a peripherally located region in the human brain. As shown in FIG. 9A, enhanced imaging sensitivity in peripheral region 122 is provided by collimator system 120 when each collimator segment 36a-36f has uniform imaging sensitivity. Sensitivity curve 130 illustrates the sensitivity as a function of radial position from the center of the imaged object. Imaging sensitivities 132a-132f represent the composite radial sensitivities of collimator segments 36a-36f, FIG. 9. The central portion of sensitivity curve 130 represents a low sensitivity since only the collimator fields of view of collimators 36a, 36b overlap in this region. In peripheral region 122, however, collimators 36c, 36e are aligned to overlap one radial portion of the fields of view of segments 36a, 36b and collimators 36d, 36f are aligned to overlap a second radial portion to provide twice the sensitivity established by segments 36a, 36b for the central region.

The system of FIG. 9 is yet another example of the method, according to this invention, by which the imaging sensitivity may be varied as a function of radial position from the center of the imaged object. The method includes aligning at least two fields of view to define at least two tomographic field of view boundaries, one of which encompasses the object. Several fields of view from several collimator segments, each of which may have uniform or non-uniform imaging sensitivity, and each of which may be parallel, converging or diverging, can be overlapped according to the desired imaging sensitivity.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A radionuclide emission tomography camera for imaging a region of an object, comprising:
   at least two collimator segments whose fields of view overlap at least in part and in combination define at least two tomographic field of view boundaries, at least one of said boundaries encompassing the region to be imaged, and at least one of the other of said boundaries disposed within said encompassing boundary and interior to the outer portion of the region;
   means responsive to said collimator segments for detecting radionuclide emissions from the region to collect at least one collimated image through each segment; and
   means for combining said collimated images to produce a final image of the region exhibiting enhanced sensitivity in the portion of overlap.

2. The tomography camera of claim 1 further including means for rotating said collimator segments.

3. The tomography camera of claim 2 in which said collimator segments have a common axis of rotation and said boundaries are concentric about said axis of rotation.

4. The tomography camera of claim 2 in which said means for rotating moves said collimator segments to successive positions about the region and said means for combining includes means for matching together images collected at the same position.

5. The tomography camera of claim 4 in which said means for matching adds together collimated images collected at each position through said collimator segments when each segment is centered at that position.

6. A radionuclide emission tomography camera for imaging a region of an object, comprising:
   at least two collimator segments whose fields of view in combination define at least one tomographic field of view boundary, said boundary encompassing the region to be imaged;
   a third collimator segment having a field of view which overlaps a portion of at least one of the other said fields of view;
   means responsive to said collimator segments for detecting radionuclide emissions from the region to collect at least one collimated image through each segment; and
   means for combining said collimated images to produce a final image of the region exhibiting enhanced sensitivity in said portion of overlap.

7. A multifield collimator system for use in a radionuclide emission tomography camera to image a region of an object, comprising at least two collimator segments whose fields of view in combination define at least two tomographic field of view boundaries, at least one of said boundaries encompassing the region to be imaged, and at least one of the other of said boundaries disposed within said encompassing boundary and interior to the outer portion of the region.

8. The collimator system of claim 7 in which said fields of view of said collimators overlap at least in part.

9. The collimator system of claim 8 in which said collimators enhance imaging sensitivity in the portion of overlap.

10. The collimator system of claim 7 in which the field of view of one of said collimators completely overlaps that of the other collimator.

11. The collimator system of claim 10 in which said other, overlapped collimator enhances imaging sensitivity throughout its field of view.

12. The collimator system of claim 7 in which said collimator segments are rotatable and have a common axis of rotation.

13. The collimator system of claim 12 in which said boundaries are concentric about said axis of rotation.

14. The collimator system of claim 12 in which said collimator segments define said boundaries as closed curves.

15. The collimator system of claim 7 in which said collimator segments are segments of a planar collimator.

16. The collimator system of claim 15 in which said collimator segments are translatable toward or away from the region.

17. The collimator system of claim 7 in which said collimator segments are segments of an arcuate collimator.

18. The collimator system of claim 17 in which said collimator segments are translatable toward or away from the region.

19. The collimator system of claim 7 in which said collimator segments define at least one boundary which encompasses the entire object.

20. The collimator system of claim 7 in which at least one of said collimator segments exhibits uniform imaging sensitivity.

21. The collimator system of claim 7 in which at least one of said collimator segments exhibits non-uniform imaging sensitivity.

22. The system of claim 7 in which at least one of said collimator segments is a parallel type collimator.

23. The system of claim 7 in which at least one of said collimator segments is a converging type collimator.

24. The system of claim 7 in which at least one of said collimator segments is a diverging type collimator.

25. The collimator system of claim 7 in which said collimator segments are segments of an annular rotating collimator.

26. A multifield collimator system for use in a radionuclide emission tomography camera to image an object, comprising:
at least two collimator segments whose fields of view in combination define at least one tomographic field of view boundary, said boundaries encompassing the region to be imaged; and
a third collimator segment having a field of view which overlaps a portion of at least one of the other said fields of view to enhance imaging sensitivity in said portion of overlap.

27. A multifield collimator system for a radionuclide emission tomography camera comprising at least two collimator segments, one of said collimator segments having a field of view at least as large as an object to be imaged, and the other of said collimator segments having a field of view smaller than the object, for enhancing imaging sensitivity in those regions of the object in which the fields of view of said collimator segments overlap.

28. A multifield method of collimation for a radionuclide emission tomography camera to image a region of an object, comprising:
aligning two fields of view relative to the region to define in combination at least two tomographic field of view boundaries, at least one of the boundaries encompassing the region, and at least one of the other of said boundaries disposed within said encompassing boundary and interior to the outer portion of the region; and
detecting within the fields of view emission signals from the region.

29. The method of claim 28 in which the fields of view are aligned to overlap at least in part.

30. The method of claim 29 in which enhanced imaging sensitivity is produced in the portion of overlap.

* * * * *

UNITED STATES PATENT OFFICE
CERTIFICATE OF CORRECTION

PATENT NO. : 4,782,233
DATED : November 1, 1988
INVENTOR(S) : Sebastian Genna, Andrew P. Smith It is certified that error appears in the above-identified patent and that said Letters Patent is hereby corrected as shown below:

Column 1, after the title of this invention, the following paragraph should be inserted:

-- This invention was made with Government support under Department of Health and Human Services Grant No. NS24609-03 awarded by the National Institute of Neurological and Communicative Disorders and Stroke. The Government has certain rights in the invention. --

Signed and Sealed this

Third Day of November, 1992

Attest:

DOUGLAS B. COMER

*Attesting Officer*  *Acting Commissioner of Patents and Trademarks*